P. G. MINOR.
HARROW.
APPLICATION FILED SEPT. 20, 1915.
1,177,883.
Patented Apr. 4, 1916.
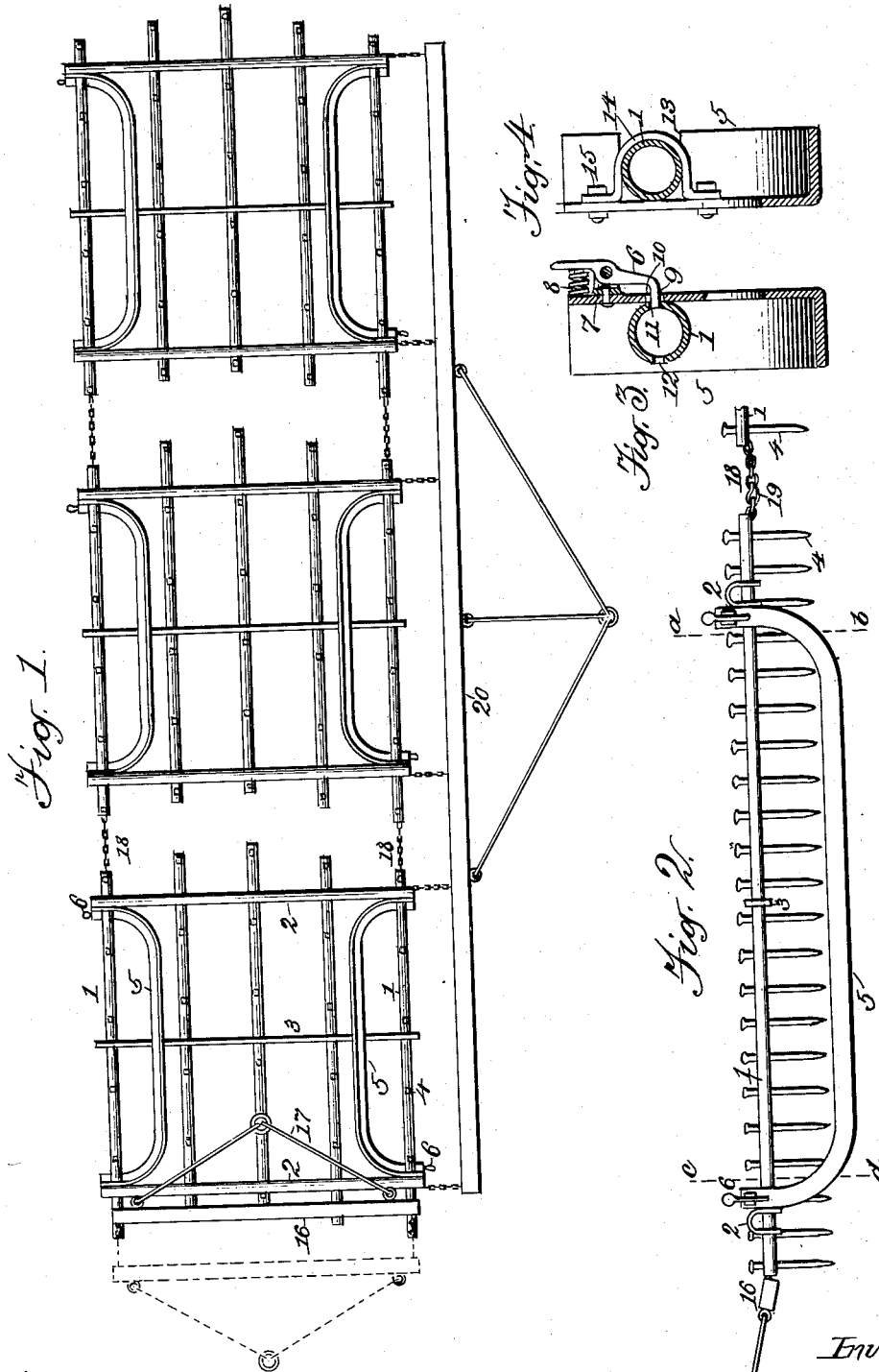

UNITED STATES PATENT OFFICE.

PHILIP G. MINOR, OF CEDAR RAPIDS, IOWA.

HARROW.

1,177,883.   Specification of Letters Patent.   Patented Apr. 4, 1916.

Application filed September 20, 1915. Serial No. 51,580.

*To all whom it may concern:*

Be it known that I, PHILIP G. MINOR, a citizen of the United States, residing at Cedar Rapids, in the county of Linn and State of Iowa, have invented certain new and useful Improvements in Harrows; and I do hereby declare the following to be a full, clear, and exact description of the invention, such as will enable others skilled in the art to which it appertains to make and use the same.

This invention relates to harrows, and the object of the invention is to facilitate the transportation of harrows, and more especially long ones, or harrows in gangs, from field to field and through lanes and gateways.

The invention consists in providing the harrows with movable runners mounted transversely to the line of movement when at work, and adapted to be folded up out of the way when the harrow is in use, and to be turned down to carrying position when needed for transportation.

It further consists in auxiliary draft apparatus adapted for hauling the harrow, or gang in a direction transverse to its working course, whereby the gang, without uncoupling may be drawn through a comparatively narrow space, such as a gate or a narrow lane.

In the accompanying drawing, forming a part of this specification, Figure 1 is a plan view of a gang of harrows of a familiar type, with runners and draft appliances attached. Fig. 2 is a side view of one of the harrows, as arranged for transportation. Fig. 3 is a section through *a b*, of Fig. 2, looking toward the right. Fig. 4 is a section through *c d*, of the same figure looking toward the left, but showing a modification in the mounting of the runner and omitting the latch.

The device is more especially adapted to harrows having cylindrical tooth-bars 1 suitably attached to cross-bars 2 and 3. These are usually coupled in a train, and the whole series connected with a hand-lever by means of which they may be rocked to change the angle of the teeth 4, but it has not been deemed necessary to illustrate this mechanism nor the special fastening of the teeth, as forming no part of this invention. On the outer pair of these tooth-bars, and between the outer cross-bars, are mounted runners 5 of a suitable height when turned to the position shown in Fig. 2 to lift the harrow-teeth clear of the ground. The simplest mounting of the runner is that shown in larger detail in Fig. 3, and is simply a hole through one of the webs of the angle-iron of which the runner is made, near each end. and of a size to receive the tooth-bar. In order to hold the runner in the upright, carrying position, one or both ends of the runner is provided with a latch 6, pivoted to a bracket 7 attached to the runner, and provided with a spring 8 to hold it in engaging position. The nose 9 of the latch projects through a hole 10 on the runner, and engages a hole 11 in the tooth-bar. When not in use the runners may be turned over and rest on top of the harrow, as shown in Fig. 1, or by providing other holes 12 in the tooth-bars, may be held in any desired position according to the location of said hole. When but one latch is used on each runner it may be placed at either end as desired, Figs. 1 and 3 showing it at one end, Fig. 2 at both ends, and Fig. 4 indicating by its absence that the latch must be at the opposite end.

The modification shown in Fig. 4 is to render the attachment of the runners more convenient in the case of harrows already built. In this case the hole for the tooth-bar is opened out at 13, so that the runner may be slipped to position on the tooth-bar sidewise, where it is revolubly secured by a strap 14 and bolts 15.

To one end of the gang of harrows is attached a draw-bar 16 and its whiffletree connections 17. The separate members of the gang are connected, as by short chains 18 and hooks 19.

Fig. 1 illustrates the harrow as in use in the field. The auxiliary draft appliance, as well as the runners being folded over on top of it.

When it is desired to draw the gang through a gate or lane, the runners are turned down to the position shown in Fig. 2, the main draft apparatus 20 is folded back over the top, and the team is hitched to the short one, 16—17, when the harrow may be drawn practically anywhere that a wagon may be.

Having thus described my invention, I claim:

1. Combined with a harrow, a pair of runners mounted revolubly on outer tooth-bars, and in a direction transverse to the travel of the harrow when at work, means for fastening said runners in carrying position, and a draft appliance attached to one side of the harrow corresponding to one end of said pair of runners.

2. Combined with a gang of harrows, runners mounted revolubly on outer tooth-bars thereof, and in a direction transverse to the working travel of the gang, connections between the units of the gang adapted to prevent their separating when drawn sidewise, and a draft appliance attached to one side of one of said harrows, corresponding to one end of its pair of runners.

3. Combined with a harrow having transversely arranged tooth-bars, runners upturned at each end, and mounted revolubly on said bars, which bars are provided with latch-holes, and latches attached to said runners to engage said holes, whereby the runners are held in carrying position.

In testimony whereof I affix my signature in presence of two witnesses.

PHILIP G. MINOR.

Witnesses:
J. M. St. John,
Ben G. Swob.